United States Patent

[11] 3,566,198

[72] Inventor Kevin Barrie Delahunty
 Chicago, Ill.
[21] Appl. No. 785,215
[22] Filed Dec. 19, 1968
[45] Patented Feb. 23, 1971
[73] Assignee Teletype Corporation

[54] LOAD SENSING AND POWER APPLICATION CIRCUIT
 16 Claims, 1 Drawing Fig.
[52] U.S. Cl. .................................................. 317/33,
 307/305, 307/252
[51] Int. Cl. .................................................. H02h 7/00,
 H03k 17/56
[50] Field of Search ...................................... 307/125,
 126, 130, 131, 252, 202, 305, 305 (A); 317/33;
 340/256; 322/11

[56] References Cited
UNITED STATES PATENTS
3,413,486 12/1968 Flieder ........................ 307/125
3,484,623 12/1969 Cain ........................... 307/305

Primary Examiner—James D. Trammwell
Assistant Examiner—Harvey Fendelman
Attorneys—J. L. Landis and R. P. Miller ABSTRACT: A manually operable switch is operated to render conductive a first bidirectional current-conducting semiconductor device in a sensing circuit when a load is connected between output terminals to condition a power application circuit for supplying alternating current to the output terminals and to energize a relay and close contacts to render conductive a second bidirectional current conducting device and to complete the power application circuit to the load. Disconnection of the load from the terminals return the bidirectional current conducting semiconductor devices to a nonconductive state and disables the load sensing and power application circuit until a load is connected across the terminals and the switch is operated.

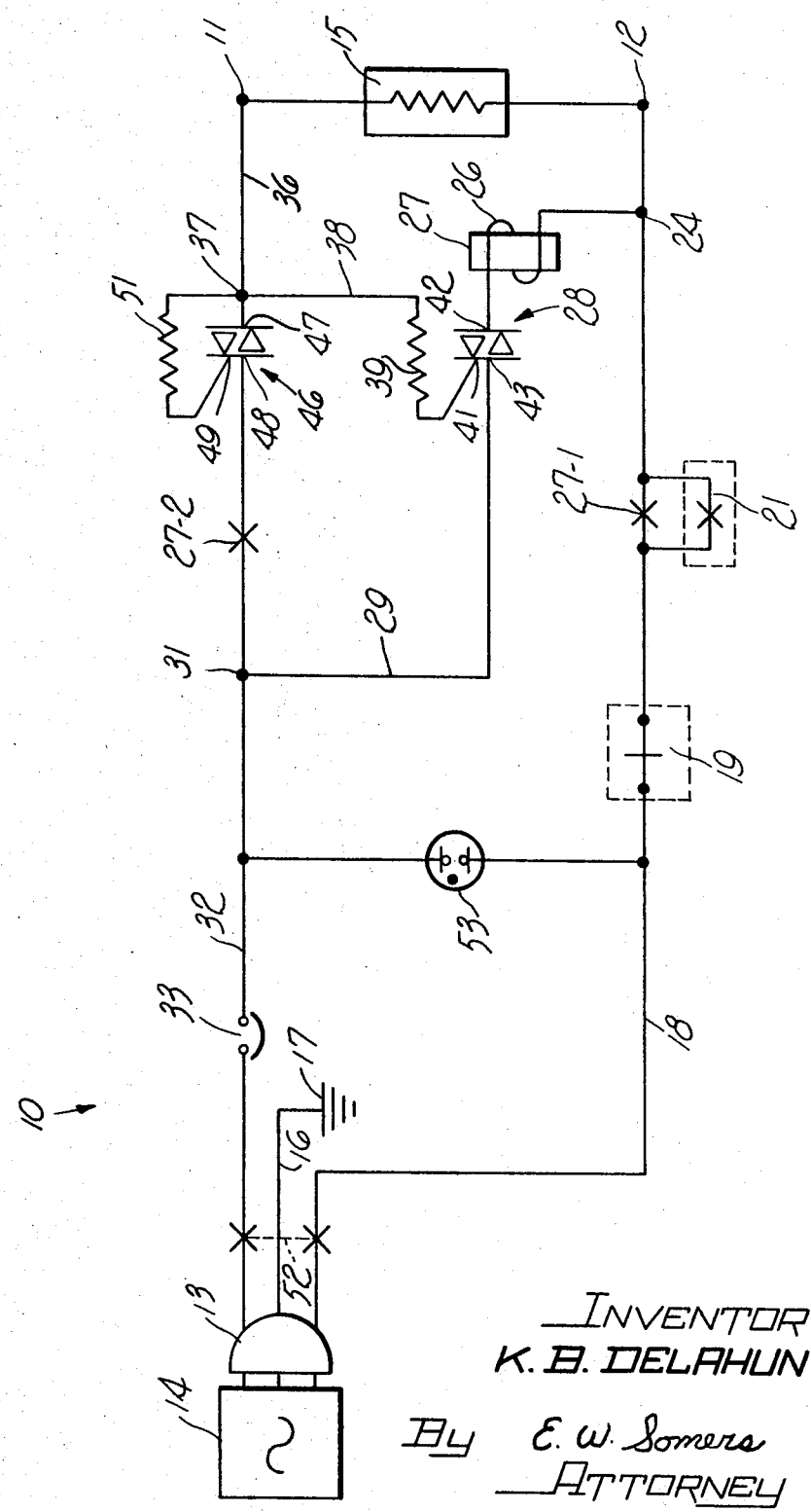
INVENTOR
K. B. DELAHUNTY
By E. W. Somers
ATTORNEY

LOAD SENSING AND POWER APPLICATION CIRCUIT

BACKGROUND OF THE INVENTION

1. Field of the Invention

This invention relates to load sensing and power application circuits and, more particularly, to a circuit which senses the presence of a load to condition a power application circuit for subsequently supplying alternating current power from a source to the load which is connected across output terminals.

2. Technical Consideration and the Prior Art

The continuous growth of the employment of electrically operated equipment in the telecommunication field has engendered problems in the supply of power for such equipment. Accordingly, considerable technical effort has been expended to develop circuitry to supply power for a variety of loads. In the telecommunication art, it is extremely important to provide a certain amount of safety for personnel in the operation of equipment which is made available in commercial offices. It is most important that a safety control circuit be interposed between a source of alternating current and the equipment or load so that when the load is disconnected from a pair of terminals of the circuit, the source of current is disconnected from the terminals.

It is therefore an object of this invention to provide a load-sensing circuit which senses the presence of a load to condition a power application circuit for supplying alternating current power to the load.

One of the characteristics that must be considered in the design of any particular power circuit is the cost factor which may be further broken down into the initial cost of construction, the operating cost, and the maintenance cost. Additional characteristics include space requirements of the circuit, and the reliability, sensitivity, and efficiency with which the circuit functions to accomplish the desired operation.

Since power control circuits may be used to control the duration of power application to a load, the response of the power control circuit to the connection of a load across output terminals of the circuit is of extreme importance. Moreover, it is desirable to supply a maximum amount of power to the load with a minimum amount of dissipation in the control circuitry. Power dissipation may be attributed to the utilization of certain components and to the number of components in the control circuit.

It is therefore an object of this invention to provide a control circuit for supplying power to a load wherein a minimum number of reliable, sensitive, and efficient components is utilized and wherein each of the components is characterized by relatively low power consumption.

SUMMARY OF THE INVENTION

With these and other objects in mind, the present invention contemplates a circuit which senses the presence of a load connected across output terminals and conditions a power application circuit and operates a switching device to complete the power application circuit to supply power to the load, and which is rendered ineffective to apply power when the load is removed from the terminals.

More particularly, a sensing circuit for supplying alternating current from a source to output terminals, includes a first bidirectional current conducting switching device which is rendered conductive when a load is connected across the terminals and a manually operated switch is depressed. The presence of the load also controls the conditioning of a power application circuit. The switching of the first bidirectional current-conducting device to a conductive state energizes a relay to close contacts to render conductive a second bidirectional current-conducting switching device and to bypass the switch which is now released to complete the power application circuit. When the load is removed from the terminals, the switching devices are rendered inoperative to deenergize the relay and open the power application circuit and effectively disconnect the surce from the output terminals.

Other objects and advantages of the present invention will be apparent from the following detailed description when considered in conjunction with the accompanying drawing.

BRIEF DESCRIPTION OF THE DRAWING

The accompanying FIGURE is a drawing of a load sensing and power application circuit which may be used to practice the principles of this invention to BRIEF DESCRIPTION OF THE DRAWING load connected to output terminals and to supply alternating current power to the terminals.

DETAILED DESCRIPTION

Referring now to the accompanying FIGURE, there is shown a system or circuit 10 for sensing the presence of a load 15 which may be connected across a pair of output terminals 11 and 12, and for then coupling the output terminals through a three-prong plug 13 to a source 14 of alternating current. The center prong of the plug 13 has a conductor 16 connected to ground 17.

A load-sensing circuit extends from the source 14 through the plug 13 and a conductor 18 through a normally closed, manually operated switch 19 and on through a normally open, manually operated switch 21 and then along the conductor 18 through a junction point 24, through a winding 26 of a relay 27 and then on through a first bidirectional current conducting semiconductor device, designated generally by the numerals 28, through a conductor 29 to a junction point 31 and back along a conductor lead 32 through a circuit breaker 33 to the plug 13. A trigger or control circuit for the first bidirectional current conducting semiconductor device 28 may be traced from junction point 24, through a load connected between the terminals 12 and 11, over a lead 36, through a junction point 37, over a lead 38, through a resistor 39 to a control electrode or gating terminal 41 for the device 28.

The bidirectional current conducting semiconductor device 28 may be any of several devices well known in the art, e.g., pairs of electronic tubes or silicon-controlled rectifiers connected in parallel with opposing orientation. Control circuitry is used to selectively deliver independent triggering pulses to the gating terminals in order to achieve a desired operation of the circuit.

Another type of electronic switching device that may be used is one designated in the trade by the name triac. Triac is a generic term that has been used to identify a triode AC semiconductor device. These semiconductor devices normally exhibit a high-impedance characteristic between two main current-carrying terminals. When a relatively low power-triggering impulse is imparted to a gating or third terminal, the device is switched to a second state wherein a low impedance is exhibited between the main current-carrying terminals.

Moreover, the triggering impulse which is imparted to the gating terminal to switch the device from a high to a low impedance state may be of either polarity. When one of the current-carrying terminals is positive with respect to the other current-carrying terminal, the triac may be switched to a low-impedance current conductive state by application of a triggering current to the gating terminal. On the other hand, when the reverse polarity is applied between the main terminals, that is when the other current-carrying terminal is negative with respect to the one current-carrying terminal, the device may be switched to a low impedance current-carrying state by extracting a triggering current from the gate terminal. In other words, conduction of current from the other main terminal to the one main terminal is initiated by the application of a positive gating pulse to the gating terminal whereas current conduction from the one main terminal to the other main terminal is initiated by the application of a negative triggering pulse to the gating terminal.

Hence, the bilateral characteristic of the main current-conducting path and the flexibility offered by the nonrestrictive form of triggering impulse render the bidirectional current-conducting semiconductor devices well suited for utilization in control circuits for supplying alternating current power. A typical bidirectional current-carrying semiconductor device, as generally referred to in the art as triac, is described in detail in U.S. Pat. 3,275,909 issued to F. W. Gutzwiller, filed Dec. 19, 1963 and assigned to the General Electric Company. A typical application of a triac to a power control circuit is described in U.S. Pat. 3,346,744 issued to E. K. Howell, filed Feb. 7, 1964 and assigned to the General Electric Company.

As shown, the triac 28 has a first main terminal 42 connected through a transconductive path to a second main terminal 43. The triac 28 is further provided with the gating electrode or terminal 41 which is effective when suitably energized to switch the transconductive path into a conductive or low-impedance state. Once the conductive state is established, the gating terminal 41 has no further effect on the triac 28 until the nonconductive state is reestablished by removing the bias from the transconductive path. When the main terminal 42 is positive relative to the main terminal 43, the triac 28 is rendered operable by applying a positive gating pulse to the gate terminal 41. When the reverse polarity is applied between the main terminals 42 and 43, the device is switched to a low impedance state by applying a negative triggering pulse to the control electrode 41.

The system also includes a power application circuit which extends from the source 14 and plug 13 along the conductor lead 18, through the normally closed switch 19, through a pair of normally open contacts 27-1 associated with the relay 27, through the junction point 24 and to the terminal 12 on through the load 15 and terminal 11 back along the conductor lead 36 through the junction point 37 and a second bidirectional current-conducting semiconductor device or triac, designated generally by the numerals 46. Finally, the power application circuit extends from the second triac 46 through a pair of normally open contacts 27-2, associated with the relay 27, through the junction point 31 along the conductor 32 through the circuit breaker 33 to the plug 13 and source 14.

The second bidirectional current-conducting semiconductor device or triac 46, identical to the first current-conducting semiconductor device 28, includes a main terminal 47 connected to the junction point 37, a second main terminal 48 connected to the relay contacts 27-2 and gating or third terminal 49. A trigger or control circuit for second triac extends from the gating terminal 49 through a resistor 51 to the junction point 37.

OPERATION

In the operation of the load-sensing power application circuit 10, the plug 13 is connected to the source 14 of alternating current. Then an operator closes a switch 52 to supply current through conductor 18 and a pilot light 53 and back through the conductor 32 and circuit breaker 33 to the plug 13 thereby illuminating the pilot light 53 and indicating to the operator that the circuit 10 is supplied with alternating current power.

The operator next depresses the switch 21 and AC voltage is impressed by the source 14 along the conductor 18 through the normally closed manually operated switch 19 and the now closed manual switch 21 through the junction point 24 and relay winding 26 of the relay 27 to make the terminal 42 of the triac 28 positive. At the same time, an AC voltage is impressed along the conductors 32 and 29 and applies a negative going potential on the other main terminal 43 of the triac 28.

In the event that no load is connected across the output terminals 11 and 12, the triac 28 is not operated and power application circuit is not rendered effective and when the operator releases the switch 21, the circuit remains inoperative in the original condition with the pilot light 53 illuminated to indicate availability of 60-cycle alternating current power.

On the other hand, if the load 15 is connected across the terminals 11 and 12 when the operator depresses the switch 21, AC voltages are impressed on the junction points 24 and 31. Assume that the voltage impressed at junction point 24 and terminal 42 is positive going and that the voltage impressed at junction point 31 and terminal 43 is negative going; then, the positive going voltage is also impressed through the load 15, over the leads 36 and 38 through the resistor 39 to the gating terminal 41 of the triac 28.

The application of a positive going potential to the gating terminal 41 of the triac 28, when the terminal 43 is negative with respect to the terminal 42 switches the triac to a conductive state to enable the transconduction path between the main terminals 43 and 42. When the triac 28 is switched to a low-impedance state between main terminals, the load-sensing circuit path from the plug 13 through the conductor 18 and switches 19 and 21, then through the relay winding 26 and triac 28 and conductor 29 to the junction point 31 and then back through the conductor 32 to the source 14 is completed to energize the relay 27.

It can be appreciated that when the alternating current source 14 impresses a negative going potential over the conductor 18 through the winding 26 to apply a negative going potential to the terminal 42 of the triac 28, that a positive going pulse is applied over the conductors 32 and 29 to apply a positive potential to the terminal 43. At the same time, a negative going voltage is impressed through the junction point 24 and load 15 through the junction point 37 and along the leads 36 and 38 through the resistor 39 to apply a negative potential to the gating terminal 41. The application of the negative potential to the gating terminal 41 when the terminal 43 is positive relative to the terminal 42 switches the triac 28 to conductive state.

In this way, the triac 28 is maintained in a conductive state even though the source 14 alternately supplies negative and positive going pulses over the conductors. Although, the change in potential on the terminals 42 and 41 from positive to negative and the change in potential on the terminal 43 from negative to positive tends to return the triac to a nonconductive state, the bidirectional characteristic of the triac reestablishes the conductive path interconnected between the main terminals to maintain the device in a conductive state.

The application of AC voltage along the conductor 18 and through the load 15 and junction point 37 also is effective to apply positive and negative going potentials to both the main terminal 47 of the triac 46 and through the resistor 51 to bias the gating terminal 49 whereupon the power application circuit, serially connected through the main terminals 48 and 47 of the triac 46, is conditioned for subsequent operation.

The energization of the relay 27 closes normally open contacts 27-1 to lock in a circuit path through the conductor 18 to the load 15 after the operator releases the manually operated switch 21. Also, the energization of the relay 27 closes normally open contacts 27-2 to apply negative and positive going potentials to the main terminal 48 of the triac 46. Inasmuch as positive and negative going potentials are applied to the other main terminal 47 and the gating terminal 49, the second triac 46 is rendered conductive to apply power through the conditioned power application circuit from the source to the load 15.

Since the triac 28 is conductive only so long as the gating terminal 41 is biased by positive and negative going voltages impressed through the load 15 connected across the terminals 11 and 12, the removal of that load immediately returns the triac 28 to a nonconductive state whereupon the relay 27 is deenergized. The deenergization of the relay 27 opens the contacts 27-2 and interrupts the current through the power application circuit. Alternatively, the normally closed, manually operated switch 19 may be depressed to open the switch and interrupt the circuit through the conductor 18 to the load 15 to deenergize the triac 28.

In addition, the removal of the load 15 from the terminals 11 and 12 removes the application of positive and negative going potentials to the gating terminal 49 of the second triac 46 to return the second triac to a nonconductive state. The second triac 46 provides additional safety for the circuit 10 in that when the load 15 is removed from the terminals 11 and 12, the triac 46 is immediately rendered nonconductive. In this way, the discontinuation of the application of power across the terminals 11 and 12 need not await the relatively slow release of the relay 27 upon switching of the first triac 28 to a nonconductive state.

The interruption of the circuit to the load 15 which deenergizes the triac 28 and deenergizes the relay 27 also opens the normally open, now closed contacts 27-1. The opening of the contacts 27-1, interrupts the circuit through the conductor 18 which may not be again completed until the switch 21, now open, is again depressed.

In this way, after the load 15 is removed from across the terminals 11 and 12 and the power application circuit is rendered ineffective, an operator who inadvertently grasps the terminals 11 and 12 is not injured, since it is necessary to depress the switch 21 before the load sensing and power application circuit may be recompleted.

I claim:

1. In a circuit for controlling the application of a source of AC power to a load:
    a pair of output terminals across which the load is connected; and
    means responsive to the connection of the load across both of the terminals for applying AC power from the source to both of said terminals, and responsive to removal of the load for interrupting the application of power to both of said output terminals.

2. In a circuit for controlling the application of a source of AC power to a load as set forth in claim 1, wherein said responsive means includes:
    a bidirectional AC switching device having a pair of main terminals and a gating terminal;
    means for connecting the main terminals across the source of AC power;
    means for applying the potential applied from the AC source through the load and gating terminal to operate said switching device;
    a relay having energizing terminals and having contacts interconnecting the source of AC power and both said output terminals; and
    means for connecting the relay energizing terminals across the source of AC power to energize the relay.

3. In a circuit interconnecting a source of AC power and a load:
    a selectively operable means for applying power to said load when said operable means is in an operated state and for precluding the application of power to the load when said operable means is in an unoperated state;
    a bidirectional electronic AC device having two main terminals and a gating terminal for initiating conduction between said main terminals in both directions;
    means connecting said main terminals across the AC power source, one of said terminals being connected between said selectively operable means and the AC power source;
    means connecting said gating terminal and one of said main terminals across said load for initiating conduction of said electronic AC device; and
    means responsive to the conduction of said device for operating said precluding means to apply power from said source to said load.

4. In a circuit interconnecting a source of AC power and a load as set forth in claim 3:
    said selectively operable means is a pair of normally open contacts; and
    said means for operating said selectively operable means is a relay.

5. In a circuit interconnecting a source of AC power and a load as set forth in claim 3, wherein:
    said selectively operable means includes:
        normally disabled switching means; and
        a second bidirectional electronic A.C. device.

6. In a circuit interconnecting a source of AC power and a load as set forth in claim 5, wherein:
    said bidirectional electronic device is a first triac; and
    said second bidirectional electronic device is a second triac having main current-conducting terminals connected serially with said normally disabled means and having a gating terminal connected to said initiating means.

7. In a circuit interconnecting a source of AC power and a load as set forth in claim 6, wherein:
    said normally disabled switching means are normally open contacts; and
    said operating means is a relay which is energized by the conduction of said first triac for closing said normally open contacts and for opening said contacts when said first triac is rendered nonconductive.

8. In a load sensing and power application circuit interconnected between a source of AC power and an electrical load:
    a bidirectional switching device having two main current-carrying terminals interconnected by a normally disabled path through the load which is enabled by the application of a triggering potential to a third control electrode;
    means for connecting the main current carrying terminals across the source of A.C. power;
    a bias circuit connected across said load for applying triggering potential to the control electrode to enable the path and initiate operation of the device;
    a relay having normally open contacts interposed between the power source and the load; and
    means connecting said relay to said device for operating said relay to close said contacts to apply power from the source to the load.

9. An electrical circuit for sensing a load connected to output terminals and for supplying power from a source to said terminals which comprises:
    thyratron-like switching means having a control electrode and normally exhibiting a high impedance between two main current carrying terminals and exhibiting low impedance between said terminals upon application of a control signal to said control electrode;
    means for connecting said two main terminals in a current-carrying path to said load and said source;
    normally open means interposed between said source and said switching means for interrupting said current-carrying path;
    means including the load for applying operating potential to one of said main terminals and applying control signals to said control electrode; and
    means responsive to the presence of the load for closing said interrupting means to apply operating potential to the other of said main terminals to complete said current path to said load.

10. In a circuit for supplying alternating current from a source to a load which is connected across a pair of spaced terminals:
    a relay having normally open contacts interposed between the source and the load;
    a bidirectional current conducting semiconductor device normally exhibiting a high impedance characteristic between two main current-carrying terminals thereof and exhibiting a low-impedance characteristic in response to the application of a control signal to a third, gating terminal thereof and the application of opposite voltages to the main terminals, one of said main terminals connected to said normally open contacts and the other of said main terminals connected to said load;
    means connected from the gating terminal through the load to the source for applying a biasing potential to the gating terminal and an operating potential to said other of said terminals connected to said load; and
    means for energizing said relay to close said contacts to apply potential to the one main terminal and operate the semiconductor device to supply power to said load.

11. In a circuit for applying AC power from a source to a load:

a first triac having a gating terminal and main terminals interconnected between the AC power and the load;

a normally open contact interposed between the AC power source and one of said main terminals;

means for applying conditioning potential through the load to the gating terminal;

a second triac having a gating terminal and main terminals connected across the source with the gating terminal of the second triac connected to receive operating potential through the load, to render said second triac conductive; and a relay coil energized by said second triac for closing said open contact to render said first triac conductive to apply said AC power to said load.

12. In a circuit for applying a voltage from a source of alternating current power to a load:

a bidirectional current conducting semiconductor device normally nonconductive between two main current-carrying terminals thereof and rendered conductive between the two main terminals in response to the application of a control signal to a gating terminal thereof;

means for connecting said two terminals in a first current-carrying path to said source;

a second current-conducting path for supplying power to the load;

normally unoperated switching means in said second current-conducting path for conducting current from the source to the load;

a relay in said first current-carrying path and having normally open contacts interposed in said second current-conducting path between the power source and the load; and means for applying a control signal to the gating terminal to render said first device conductive to energize said relay and close said contacts to operate said switching means and complete said second conducting path from the source to the load.

13. In an electrical circuit for sensing a load connected to output terminals and for supplying power from a source to said terminals when said load is connected thereto:

circuit means for connecting said source to said load;

a first triac having two main terminals connected in parallel with said load and a third, gating terminal connected in series with said load;

a second triac in said circuit means and having two main terminals connected in series with said load and a gating terminal connected in series with the gating terminal of the first triac;

normally unoperated switching means in said circuit;

means applying a triggering current to said gating terminals of said first and second triacs for switching said first triac to a conductive state and for conditioning said circuit means for conductance; and means connected in series with said first triac and energized by said first triac for operating said normally unoperated switching means to operate said second triac and to complete said circuit means to said load.

14. In an electrical circuit for sensing a load connected to output terminals and for supplying power to said terminals when said load is connected thereto:

first thyratron-like switching means having a control electrode, and a normally disabled transconductive path which is enabled by energizing the control electrode;

means for connecting said source to said load which includes:

second thyratron-like switching means identical to said first-switching means; and normally open means interposed between said source and load;

means connected through the load for energizing said control electrodes to enable the path in the second-switching means and condition the connecting means for conductance; and means responsive to the enabling of the path in the first-switching device for closing said normally open means to complete said connecting means.

15. In a system for sensing a load connected to output terminals and for then applying alternating current power from a source to the load:

normally unconditioned circuit means for connecting said source to said load, including:

a first AC switching device having a gating terminal and a normally disabled transconductive path between two main terminals which is enabled for conductance by applying a triggering current of either polarity to the gating terminal and a potential across the main terminals; and first normally open means interposed between said source and one of said main terminals;

second normally open means interposed between said load and said source; and circuit means connected to said source for sensing a load connected to the output terminals and for completing said normally unconditioned circuit means, which includes:

a second AC switching device having a gating terminal serially connected with the gating terminal of the first-switching means for normally applying potential from the source across the two main terminals thereof;

means energized by said second-switching device for closing said normally open means; and means responsive to the connection of a load to the output terminals for applying potential to said gating terminals to condition said normally unconditioned circuit means and to operate said second-switching device to energize said closing means and close said normally open means to operate said first-switching device and complete said now conditioned circuit means.

16. In an electrical circuit for sensing a load connected to output terminals and for supplying power from an AC source to said terminals:

a first bidirectional current conducting semiconductor device normally exhibiting a high impedance disabled path between two main current-carrying terminals and a low-impedance characteristic to enable said disabled path in response to the application of a control signal to a third gating terminal thereof, the minimum value of said signal being the same for both directions of current between said two terminals;

means for connecting said two main terminals of said first semiconductor device in a current-carrying path to said source;

a normally unconditioned circuit between said load and said source which includes:

a second bidirectional current-conducting semiconductor device identical to said first semiconductor device with the gating terminal of said second device connected in series with the gating terminal of said first device and the two main terminals of the second device connected in said normally unconditioned circuit from the source to the load;

normally open means interposed between said source and said second semiconductor device;

means for applying a control signal to said gating terminals to enable said paths and condition said circuit between said source and said load for applying power to the load; and means responsive to the enabling of said path through said first semiconductor device for closing said normally open means to complete the conditioned circuit to supply power to the load.